United States Patent
Eisenhauer et al.

(10) Patent No.: US 8,564,914 B2
(45) Date of Patent: Oct. 22, 2013

(54) FAULT CLEARING WITHOUT A DC BACKUP POWER SOURCE

(75) Inventors: Mark P. Eisenhauer, Milford, CT (US); Christopher Patrick Sullivan, Bridgeport, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 13/400,982

(22) Filed: Feb. 21, 2012

(65) Prior Publication Data

US 2013/0215536 A1    Aug. 22, 2013

(51) Int. Cl.
*H02H 7/06* (2006.01)
*H02H 3/00* (2006.01)
*H02H 9/08* (2006.01)

(52) U.S. Cl.
USPC ............................. 361/20; 361/21; 361/42

(58) Field of Classification Search
USPC ........................................................... 361/42
See application file for complete search history.

(56) References Cited

U.S. PATENT DOCUMENTS

| | | | |
|---|---|---|---|
| 6,344,700 B1 | 2/2002 | Eisenhauer et al. | |
| 7,117,105 B2 | 10/2006 | Premerlani et al. | |
| 7,514,819 B2 * | 4/2009 | Kichline, Jr. ................ | 307/108 |
| 7,626,798 B2 | 12/2009 | Rusan et al. | |
| 7,638,985 B2 | 12/2009 | Tandon | |
| 7,876,542 B2 | 1/2011 | Rozman et al. | |
| 8,148,848 B2 * | 4/2012 | Rusan et al. .................. | 307/82 |
| 2011/0198931 A1 | 8/2011 | Ly | |

* cited by examiner

*Primary Examiner* — Dharti Patel
(74) *Attorney, Agent, or Firm* — Cantor Colburn LLP

(57) ABSTRACT

An electrical power protection system, includes a generator configured for supplying Direct Current (DC) power to a load bus, the load bus in electrical communication with a bus circuit; a generator control unit being configured for regulating the output voltage supplied by the generator; a bus contactor in serial communication with the bus circuit, the bus contactor including logic circuits configured for detecting an overcurrent in the bus circuit, the overcurrent representative of a ground fault in the bus circuit; and a capacitor bank coupled to the generator for selectively supplying an excitation voltage through a diode switch to the generator during the ground fault in the bus circuit.

20 Claims, 2 Drawing Sheets

FAULT CLEARING WITHOUT A DC BACKUP POWER SOURCE

FIELD OF INVENTION

The subject matter disclosed herein relates generally to the field of electrical power systems and, particularly, to an aircraft's electrical power system having a capacitor source for supplying power to a self-excited generator in order to maintain the generators field during a fault clearing mode.

DESCRIPTION OF RELATED ART

Typically, an aircraft's electrical power system includes a DC power generator as a primary power source with batteries serving as an emergency backup power source. The DC power generator is used to start an aircraft's engine and, once started, the engines cause power generation through the power generators resulting in electrical power being supplied to load busses in the electrical power system. A typical twin engine generator power system would consist of two generators, one per engine. A first generator would be used for starting the first engine and for providing, for example, electrical power to the left hand busses. A second generator would be used for starting the second engine and providing power to the right hand busses. In the event that the first generator was to fail, the power system would compensate by providing power to all buses through the remaining generator. In some cases, the remaining load busses can overload the remaining generator, resulting in its failure as well. Most power systems, therefore, also include a battery backup for providing supplemental power to if one or both of the generators fail. The battery feeds power to the emergency busses and the essential busses.

BRIEF SUMMARY

According to one aspect of the invention, an electrical power protection system includes a generator configured for supplying Direct Current (DC) power to a load bus, the load bus in electrical communication with a bus circuit; a generator control unit being configured for regulating the output voltage supplied by the generator; a bus contactor in serial communication with the bus circuit, the bus contactor including logic circuits configured for detecting an overcurrent in the bus circuit, the overcurrent representative of a ground fault in the bus circuit; and a capacitor bank coupled to the generator for selectively supplying an excitation voltage through a diode switch to the generator during the ground fault in the bus circuit.

According to another aspect of the invention, a method of clearing a ground fault in an electrical power protection system includes supplying Direct Current (DC) power, via a self-excited generator, to a main bus circuit; regulating, via a generator control unit, the output voltage supplied by the generator; detecting, via a bus contactor, an overcurrent in the main bus circuit, the overcurrent representative of a ground fault in the bus circuit; and selectively supplying, via a capacitor bank coupled to the generator, an excitation voltage through a diode switch to the generator during the ground fault in the bus circuit.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an aircraft's electrical power protection system includes a DC electrical power system having a capacitor bank for selectively applying power to the system when back up battery power is not available to clear a ground fault. The system includes a capacitor bank connected to a field line of a self-excited generator for supplying hold-up power to the generator during a fault clearing mode. Additionally, the capacitor bank supplies power to the logic circuits of a bus tie contactor for maintaining its logic during the fault clearing mode as well as for selectively opening the logic circuit and isolating the fault from the main circuit.

Figure 1:
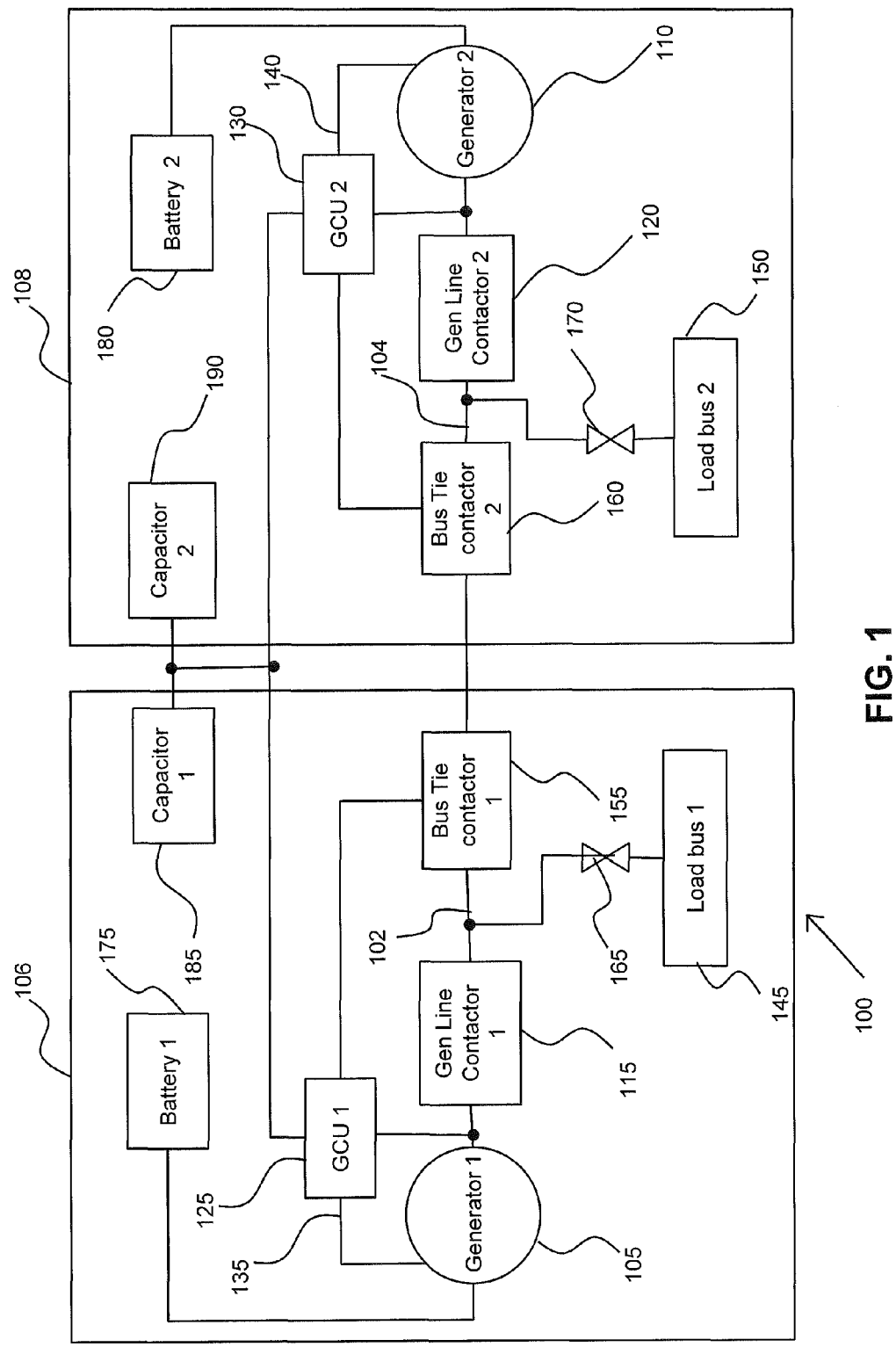
FIG. 1 illustrates a schematic block diagram of the DC electrical power system according to an embodiment of the invention.

Referring now to the drawings, FIG. 1 illustrates a schematic block diagram of an aircraft's electrical power protection system 100 having a plurality of engines 106, 108 including generators 105, 110 for selectively applying power to the power protection system 100 in order to clear a ground fault according to an embodiment of the invention. Particularly, the electrical power protection system 100 includes, in an embodiment, a plurality of power sources such as, for example, self-excited DC generators 105, 110 connected in parallel to Direct Current ("DC") bus circuits 102, 104. In embodiments, the power sources 105, 110 may be permanent magnet generators, or three-phase AC generators having rectifiers for receiving power from the generators 105, 110 and distributing 28VDC power to the DC bus circuits 102, 104 respectively. The engine 106 includes a DC self-excited generator 105, which feeds electrical power to the main circuit 102 and to equipment connected to the load bus 145 while engine 108 includes DC self-excited generator 110, which feeds electrical power to the main circuit 104 and to equipment connected to the load bus 150. Also, self-excited generator 105 is connected to a generator control unit 125 and generator line contactor 115 while self-excited generator 110 is connected to generator control unit 130 and generator line contactor 120. The generator control units 125, 130 are microprocessor controlled devices and include an overvoltage sensing circuit that regulates the output voltage being supplied by the respective DC self-excited generators 105, 110. In particular, the generator control unit 125 continually regulates the output voltage being supplied by self-excited generator 105 by feeding the output voltage back to an excitation circuit (not shown) in the self-excited generator 105 with a return line 135 in order to excite the field of the self-excited generator 105. Additionally, the generator control unit 125 may disconnect the power source 105 from the main circuit 102 if the voltage exceeds a preset level. Similarly, generator control unit 130 continually regulates the output voltage being supplied by self-excited generator 110 and feeds the output voltage back to an excitation circuit (not shown) in the self-excited generator 110 with a return line 140 in order to excite the field of the self-excited generator 105. Additionally, the generator control unit 125 may disconnect the power source 110 from the main circuit 104 if the voltage exceeds a preset level. Each generator control unit 125, 130 energizes its respective generator line contactor 115, 120 for electrically connecting the self-excited generators 105, 110 to the main circuits 102, 104 when the generator outputs from each self-excited generator 105, 110 are within specified limits. The generator control units 125, 130 are preprogrammed to sense when a short circuit occurs in the load busses 145, 150 and supply hold-up power to the self-excited generators 105, 110 in order to clear the fault caused by the short circuit. In embodiments, the system 100 includes backup batteries 175, 180 that are connected to the respective generators 105, 110 through diode switches (not shown) in order to excite the field of the generators 105, 110 during a ground fault. In operation, in the event of a short circuit, the generator control units 125, 130 provide power to self-excited generators 105, 110 through capacitor banks 185, 190 respectively as well as energizing the bus tie contactors 155, 160. The capacitor banks 185, 190 provide voltage to the self-excited generators 105, 110 in order to maintain the voltage level of the generator's field when the self-excited generators respective batteries 175, 180 are not available in order to clear the fault, as is shown and described below with reference to FIG. 2.

Also shown in FIG. 1, the power protection system 100 includes bus contactors 155, 160 electrically connected to load buses 145, 150. In an embodiment, load buses 145, 150 include respective current limiting devices 165, 170 such as, for example a fuse or a thermal "trip" device in order to provide fault protection on each of the load buses 145, 150 during a short circuit. In an embodiment, the current limiting device is an 80 Ampere fuse or thermal device that is rated to "open" or "trip" at a predetermined $I^2t$ rating (i.e., a time-current thermal value or "trip curve"). Other current limiting devices having a different $I^2t$ rating may also be utilized in embodiments. In an example, the bus tie contactors 155, 160 include hall-effect sensors (not shown) for monitoring the bidirectional current values traversing through the main circuits 102, 104. The bus tie contactors 155, 160 include logic circuits that are programmed, in embodiments, with predetermined ht curves for "tripping" or opening for currents (i.e., interrupt the circuit) exceeding the rated values in either direction of the contactors 155, 160 such as, for example, in the event of a ground fault or loss of one or more of the self-excited generators 105, 110. The bus tie contactors 155, 160 selectively open their contacts if the measured bidirectional currents exceed a predetermined current value in either direction through the contactors 155, 160. It is to be appreciated that while only two power sources 105, 110 are shown in electrical communication with the load busses 145, 150, additional power supplies or additional load busses may be connected to the main circuits 102, 104 without departing from the scope of the invention.

Figure 2:
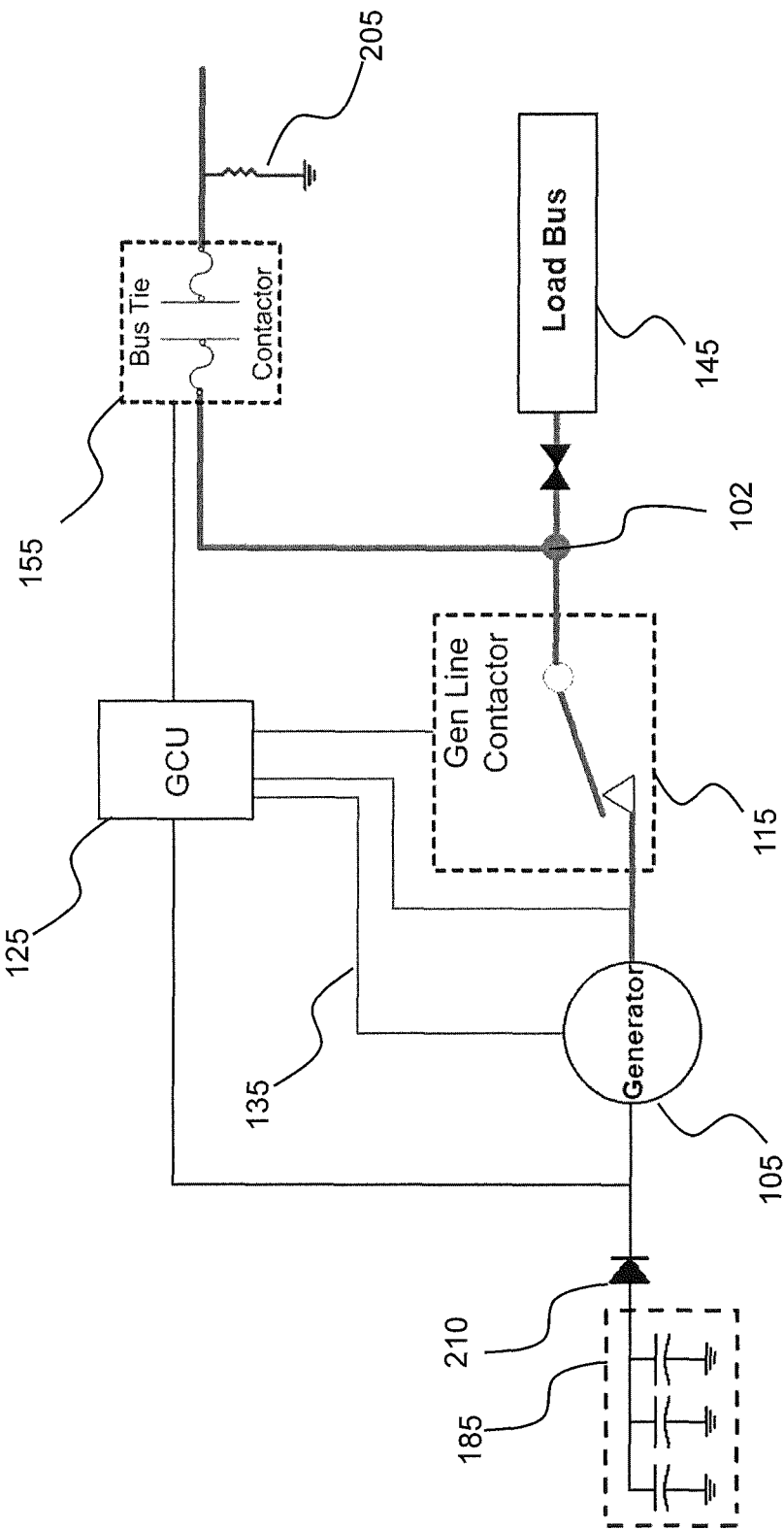
FIG. 2 illustrates a schematic block diagram of an algorithm used to clear a fault utilizing a capacitor as a backup power source according to an embodiment of the invention.

FIG. 2 illustrates a schematic block diagram of an algorithm for clearing a fault utilizing a capacitor bank as a backup power source according to an embodiment of the invention. Although, a description of the algorithm for clearing a fault in engine 106 is shown, this algorithm provides an adequate description of the algorithm used for clearing a fault in engine 108 (FIG. 1) and in load bus 150 connected to power source 110 and its circuit 104 (FIG. 1). The generator control unit 125 energizes the generator line contactor 115 for electrically connecting the output from the self-excited generator 105, to the main circuit 102 when the generator outputs from the generator 105 is within specified limits. The generator control unit 125 is preprogrammed to sense when a ground fault occurs in the load bus 145 and supplies hold-up power to the generator 105 during a ground fault. In an embodiment, in the event of a "ground fault" 205 (for example, in the order of a 5 milliohm resistance to ground) in load bus 145 such as, for example, a bare copper wire that makes contact with a larger bus wire causing a "ground fault", an excess ground current will flow from self-excited generator 105 through the main circuit 102 and into load bus 145. The excess ground current collapses the field in self-excited generator 105, thus lowering the output voltage from the self-excited generator 105 and selectively opening the generator line contactor 115. The generator control unit 125, which continually monitors the output voltage being supplied by the self-excited generator 105, connects the capacitor bank 195 through the diode 210 to the field line 135 in the event of a failure of the backup battery 175 (FIG. 1). The capacitor bank 195 sources voltage to the self-excited generator 105 in order to maintain the field of the generator 105 for a predetermined amount of time and energize the main circuit 102 by closing the generator line contactor 115. The generator 105 feeds current to the main circuit 102 for the predetermined time needed to burn through the bare copper wire that is causing the ground fault, thereby clearing the fault. In other embodiments, the generator control unit 105 cycles the generator 105 for a predetermined number of times in order to supply a burst of current during each cycle of the generator and clear the ground fault. Also, the generator control unit 125 supplies power to the logic circuits in the bus tie contactor 155 in order to maintain their logic during the time utilized by the generator to clear the fault. Further, the capacitive bank 195 provides power to the bus tie contactor 155 for sensing the short circuit current caused by the ground fault, where the contactor 155 may selectively open its contact and isolate the load bus 145 from the main circuit 102, thereby preventing the generator 105 and devices connected to the load bus 145 from being damaged.

The technical effects and benefits of exemplary embodiments include a DC electrical power protection system having a capacitor bank for selectively applying power to the system in order to clear a fault. The system includes a capacitor bank connected to a field line of a self-excited generator for supplying hold-up power to the generator during the fault clearing mode. Additionally, the capacitor bank supplies power to the logic circuits of a bus tie contactor for maintaining its logic during the fault clearing mode as well as for selectively opening the logic circuit and isolating the fault from the main circuit.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:
1. An electrical power protection system, comprising:
a generator configured for supplying Direct Current (DC) power to a load bus, the load bus in electrical communication with a bus circuit;
a generator control unit being configured for regulating the output voltage supplied by the generator;
a bus contactor in serial communication with the bus circuit, the bus contactor including logic circuits configured for detecting an overcurrent in the bus circuit, the overcurrent representative of a ground fault in the bus circuit; and a capacitor bank coupled to the generator for selectively supplying an excitation voltage to the generator control unit and the bus contactor during the ground fault in the bus circuit.

2. The system of claim 1, wherein the load bus is configured for energizing at least a device connected to the load bus.

3. The system of claim 1, further comprising a generator line contactor configured for electrically coupling the output voltage to the bus circuit.

4. The system of claim 3, wherein the capacitor bank selectively supplies the excitation voltage to the generator control unit, the bus contactor and the generator line contactor for a predetermined time during the ground fault.

5. The system of claim 4, wherein the generator supplies DC current to the bus circuit for the predetermined time to clear the ground fault.

6. The system of claim 4, wherein the generator supplies the output voltage by exciting a field circuit connected to the field line of the generator.

7. The system of claim 1, wherein the generator control unit is configured for regulating the output voltage by supplying the excitation voltage to an excitation circuit in the generator.

8. The system of claim 1, wherein the generator control unit includes a microprocessor operable to selectively connect the capacitor bank to the generator when a loss of backup battery is detected.

9. The system of claim 1, wherein the generator control unit is configured for supplying DC voltage to the bus contactor during the ground fault.

10. The system of claim 1, wherein the bus contactor includes at least one trip curve that is configured to open in response to detecting the overcurrent in the bus circuit.

11. A method of clearing a ground fault in an electrical power protection system, comprising:
supplying Direct Current (DC) power, via a self-excited generator, to a main bus circuit;
regulating, via a generator control unit, the output voltage supplied by the generator;
detecting, via a bus contactor, an overcurrent in the main bus circuit, the overcurrent representative of a ground fault in the bus circuit; and
selectively supplying, via a capacitor bank coupled to the generator, an excitation voltage to the generator control unit and the bus contactor during the ground fault in the bus circuit.

12. The method of claim 11, wherein the bus contactor includes logic circuits configured for detecting the overcurrent in the main bus circuit.

13. The method of claim 11, further comprising electrically coupling, via a generator line contactor, the output voltage to the bus circuit.

14. The method of claim 13, further comprising supplying, via the capacitor bank, the excitation voltage to the generator control unit, the bus contactor and the generator line contactor for a predetermined time during the ground fault.

15. The method of claim 14, wherein the generator supplies DC current to the bus circuit for the predetermined time to clear the ground fault.

16. The method of claim 11, wherein the generator control unit is configured for regulating the output voltage by supplying the excitation voltage to an excitation circuit in the generator.

17. The method of claim 11, wherein the generator control unit includes a microprocessor operable to selectively connect the capacitor bank to the generator when a loss of backup battery is detected.

18. The method of claim 11, wherein the generator control unit is configured for supplying DC voltage to the bus contactor during the ground fault.

19. The method of claim 11, wherein the bus contactor includes at least one trip curve that is configured to open in response to detecting the overcurrent in the bus circuit.

20. An electrical power protection system, comprising:
a generator configured for supplying Direct Current (DC) power to a load bus, the load bus in electrical communication with a bus circuit;
a generator control unit being configured for regulating the output voltage supplied by the generator;
a generator line contactor configured for electrically coupling the output voltage to the bus circuit;
a bus contactor in serial communication with the bus circuit, the bus contactor including logic circuits configured for detecting an overcurrent in the bus circuit, the overcurrent representative of a ground fault in the bus circuit; and
a capacitor bank coupled to the generator for selectively supplying an excitation voltage to the generator control unit, the generator line contactor and the bus contactor during the ground fault in the bus circuit;
the generator control unit controlling providing the excitation voltage to the generator line contactor and bus contactor in bursts a predetermined number of times to clear the ground fault.

* * * * *